US012757825B2

(12) United States Patent
Roberge et al.

(10) Patent No.: US 12,757,825 B2
(45) Date of Patent: Oct. 13, 2026

(54) SYSTEM AND METHOD FOR CONTROLLING AN AIR-ASSISTED CONVEYING SYSTEM OF AN AGRICULTURAL HARVESTER

(71) Applicants: CNH Industrial America LLC, New Holland, PA (US); CNH Industrial Canada, Ltd., Saskatoon (CA)

(72) Inventors: Martin J. Roberge, Quebec (CA); Jonathan E. Ricketts, Coal Valley, IL (US)

(73) Assignees: CNH Industrial America LLC, New Holland, PA (US); CNH Industrial Canada, Ltd., Saskatoon (CA)

( * ) Notice: Subject to any disclaimer, the term of this patent is extended or adjusted under 35 U.S.C. 154(b) by 52 days.

(21) Appl. No.: 18/647,666

(22) Filed: Apr. 26, 2024

(65) Prior Publication Data

US 2024/0357963 A1 Oct. 31, 2024

Related U.S. Application Data

(60) Provisional application No. 63/462,589, filed on Apr. 28, 2023.

(51) Int. Cl.

*A01D 41/127* (2006.01)
*A01D 46/08* (2006.01)
*A01D 61/00* (2006.01)

(52) U.S. Cl.

CPC ......... *A01D 41/127* (2013.01); *A01D 46/085* (2013.01); *A01D 61/00* (2013.01)

(58) Field of Classification Search

CPC .... A01D 41/127; A01D 46/085; A01D 61/00; A01D 43/077

See application file for complete search history.

(56) References Cited

U.S. PATENT DOCUMENTS 4,068,223 A 1/1978 Steffen
7,249,449 B2 * 7/2007 Goering ............... A01D 46/085 56/30

(Continued)

FOREIGN PATENT DOCUMENTS

CN 114342654 A 4/2022

OTHER PUBLICATIONS

Notification of the First Office Action for Chinese Pat. App. No. 202410495070.2, dated Jan. 24, 2026, 19 pages.

*Primary Examiner* — Erin M Piateski
*Assistant Examiner* — Hajar Hassaniardekani
(74) *Attorney, Agent, or Firm* — Foley & Lardner LLP

(57) ABSTRACT

An air-assisted conveying system of an agricultural harvester includes a controller configured to receive a first sensor signal indicative of a first air pressure at a first location within a line and to receive a second sensor signal indicative of a second air pressure at a second location within the line. Furthermore, the controller is configured to determine an air pressure differential based on the first air pressure and the second air pressure. In response to determining the air pressure differential is greater than a threshold value, the controller is configured to control a supplemental air source to provide supplemental air to the line for a supplemental air duration. In addition, in response to determining the air pressure differential is greater than the threshold value during the supplemental air duration, the controller is configured to control an operational air source to increase an operational air flow through the line.

20 Claims, 5 Drawing Sheets

(56) References Cited

U.S. PATENT DOCUMENTS

| | | | | |
|---|---|---|---|---|
| 8,073,599 | B2 * | 12/2011 | Goering | A01D 46/08 56/10.2 G |
| 9,615,506 | B2 | 4/2017 | Ruppert et al. | |
| 9,681,605 | B2 | 6/2017 | Noonan | |
| 9,706,709 | B2 | 7/2017 | Cracraft | |
| 2006/0005521 | A1 | 1/2006 | Goering et al. | |
| 2015/0366127 | A1 * | 12/2015 | Roberge | A01C 15/04 239/11 |
| 2016/0128270 | A1 * | 5/2016 | Ruppert | A01C 15/04 701/50 |

* cited by examiner

SYSTEM AND METHOD FOR CONTROLLING AN AIR-ASSISTED CONVEYING SYSTEM OF AN AGRICULTURAL HARVESTER

BACKGROUND

The present disclosure relates generally to a system and method for controlling an air-assisted conveying system of an agricultural harvester.

Agricultural harvesters are used to harvest agricultural products (e.g., cotton or other natural material(s)). For example, an agricultural harvester may include a header having drums configured to harvest the agricultural product from a field. The agricultural harvester may also include an air-assisted conveying system configured to move the agricultural product from the drums to an accumulator. The agricultural product may then be fed into a baler (e.g., via belt(s)). The baler may compress the agricultural product into a package to facilitate storage, transport, and handling of the agricultural product. For example, a round baler may compress the agricultural product into a round bale within a baling chamber, such that the round bale has a desired size and density. After forming the bale, the bale may be wrapped with a bale wrap to secure the agricultural product within the bale and to generally maintain the shape of the bale. Unfortunately, under certain operating conditions, the agricultural product may become plugged within at least one line of the air-assisted conveying system, thereby interfering with operation of the agricultural harvester.

BRIEF DESCRIPTION

In certain embodiments, an air-assisted conveying system of an agricultural harvester includes a controller having a memory and a processor. The controller is configured to receive a first sensor signal indicative of a first air pressure at a first location within a line of the air-assisted conveying system, and the controller is configured to receive a second sensor signal indicative of a second air pressure at a second location within the line of the air-assisted conveying system. Furthermore, the controller is configured to determine an air pressure differential based on the first air pressure and the second air pressure. In response to determining the air pressure differential is greater than a threshold value, the controller is configured to control a supplemental air source to provide supplemental air to the line for a supplemental air duration. In addition, in response to determining the air pressure differential is greater than the threshold value during the supplemental air duration, the controller is configured to control an operational air source to increase an operational air flow through the line.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
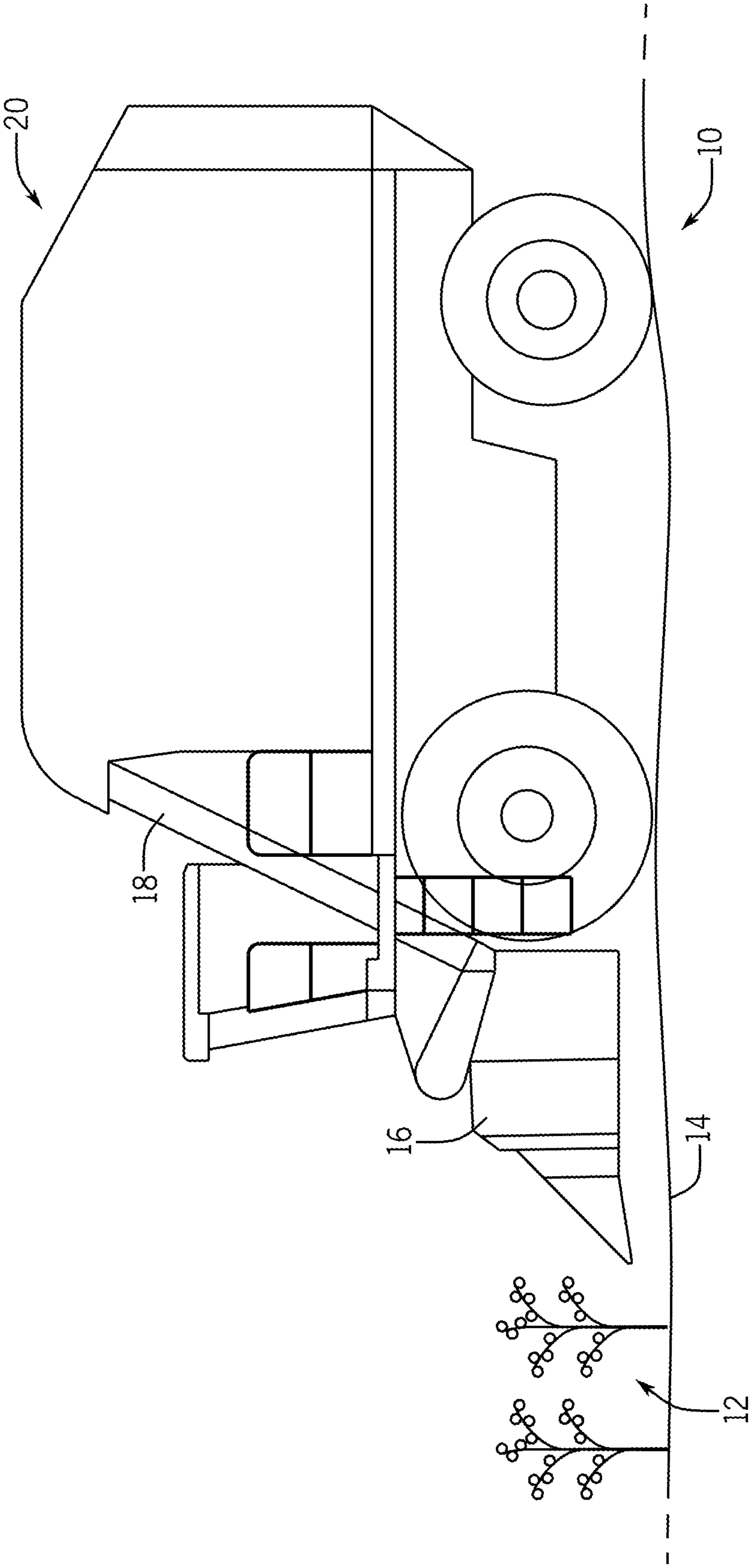
FIG. 1 is a side view of an embodiment of an agricultural system having an air-assisted conveying system.

FIG. 1 is a side view of an embodiment of an agricultural system 10 (e.g., harvester, agricultural harvester) having an air-assisted conveying system. The agricultural system 10 is configured to harvest agricultural product 12 (e.g., cotton) from a field 14 and to form the agricultural product 12 into bales (e.g., agricultural bales). In the illustrated embodiment, the agricultural system 10 includes a header 16 having drums configured to harvest the agricultural product 12 from the field 14. Additionally, the agricultural system 10 includes an air-assisted conveying system 18 configured to move the agricultural product 12 from the drums of the header 16 to an accumulator. The agricultural product 12 may then be fed into a baler 20 (e.g., agricultural baler), such as via belt(s). The baler 20 is supported by and/or mounted within or on a chassis of the agricultural system 10. The baler 20 may form the agricultural product 12 into round bales. However, in other embodiments, the baler 20 of the agricultural system 10 may form the agricultural product into square bales, polygonal bales, or bales of other suitable shape(s). After forming the agricultural product 12 into a bale, a bale wrapping system of the agricultural system 10 wraps the bale with a bale wrap to secure the agricultural product 12 within the bale and to generally maintain a shape of the bale.

As discussed in detail below, the air-assisted conveying system 18 includes a controller having a memory and a processor. The controller is configured to receive a first sensor signal indicative of a first air pressure at a first location within a line of the air-assisted conveying system, and the controller is configured to receive a second sensor signal indicative of a second air pressure within the line of the air-assisted conveying system. In addition, the controller is configured to determine an air pressure differential based on the first air pressure and the second air pressure. The controller is configured to compare the air pressure differential to a threshold value. The threshold value may correspond to a pressure differential associated with an impending plugging condition. The impending plugging condition may correspond to an operating condition (e.g., with insufficient air flow) that has a substantial potential to ultimately result in plugging (e.g., a buildup of agricultural product within the line). The controller is configured to control a supplemental air source to provide supplemental air to the line for a supplemental air duration in response to determining the air pressure differential is greater than the threshold value. Furthermore, the controller is configured to control an operational air source to increase an operational air flow through the line in response to determining the air pressure differential is greater than the threshold value during the supplemental air duration. Accordingly, the possibility of plugging within the line may be substantially reduced or eliminated, thereby enhancing the effectiveness of the agricultural system.

Figure 2:
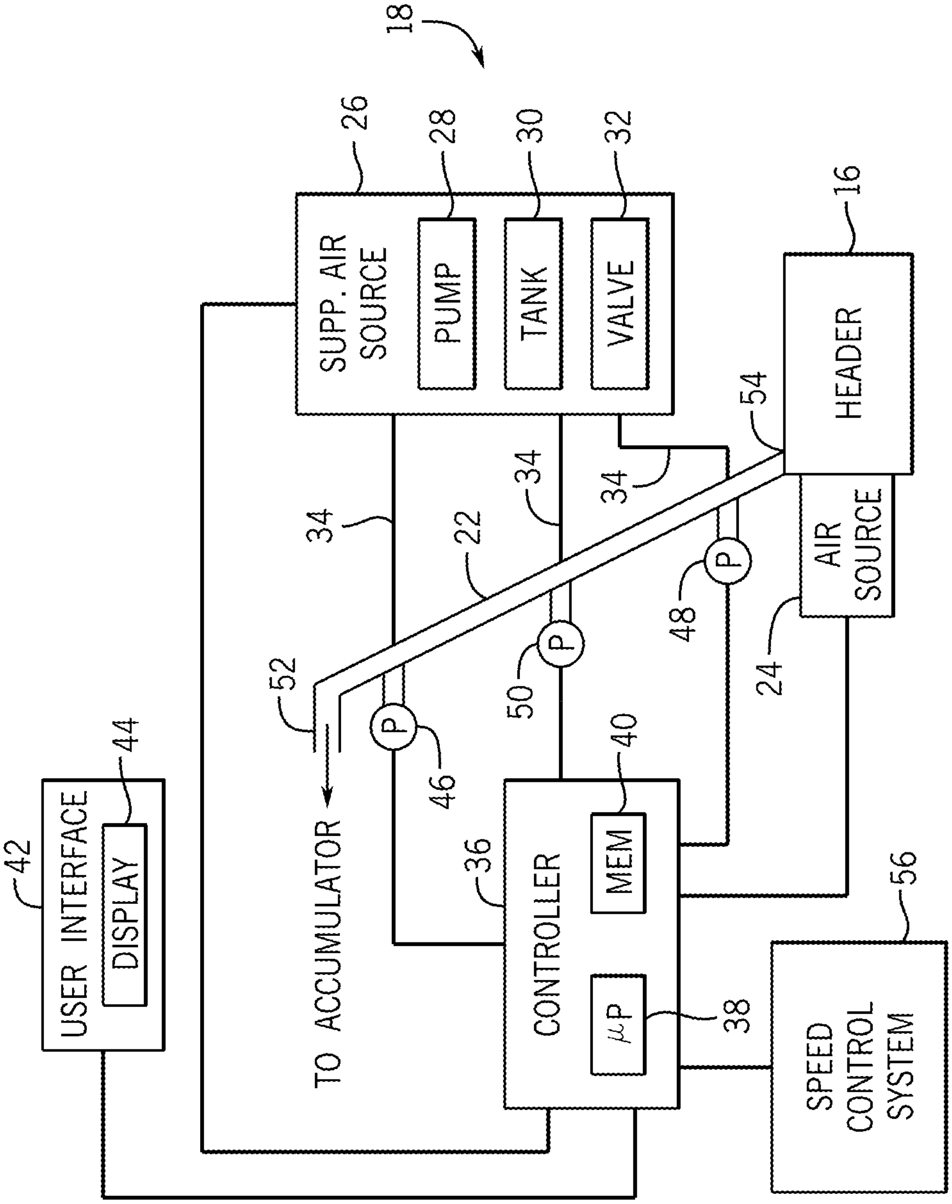
FIG. 2 is a schematic diagram of an embodiment of an air-assisted conveying system that may be employed within the agricultural system of FIG. 1.

FIG. 2 is a schematic diagram of an embodiment of an air-assisted conveying system 18 that may be employed within the agricultural system of FIG. 1. As previously discussed, the air-assisted conveying system 18 is configured to move agricultural product from the drums of the header 16 to the accumulator. The air-assisted conveying system 18 may include one or more lines 22, and each line may direct the agricultural product (e.g., cotton or other natural material(s)) from a respective drum of the header 16 to the accumulator(s). For example, in certain embodiments, the air-assisted conveying system 18 may include 1, 2, 3, 4, 5, 6, 7, 8, 9, 10, 11, 12, or more lines (e.g., corresponding to the number of drums of the header). Furthermore, in certain embodiments, multiple lines (e.g., 2, 3, 4, or more) may direct the agricultural product from a single drum to the accumulator, and/or one line may direct the agricultural product from multiple drums (e.g., 2, 3, 4, or more) to the accumulator.

In the illustrated embodiment, the air-assisted conveying system 18 includes an operational air source 24. The operational air source 24 is configured to provide an operational air flow through each line 22, thereby driving the agricultural product to move from the header 16 to the accumulator. In certain embodiments, the drums of the header 16 are configured to output the agricultural product to the lines 22 of the air-assisted conveying system 18, and the operational air source 24 is configured to provide operational air flows through the lines 22 sufficient to move the agricultural product to the accumulator. The operational air source 24 may include one or more blowers (e.g., fan(s), etc.) and one or more motor(s) (e.g., electric motor(s), pneumatic motor(s), hydraulic motor(s), etc.) configured to drive the blower(s). For example, in certain embodiments, the operational air source may include a single motor coupled to a single blower, and the single blower may provide a respective operational air flow to each line. Furthermore, in certain embodiments, the operational air source may include a blower for each line, and a respective motor may drive each blower, thereby providing individual control of the operational air flow through each line.

Furthermore, in the illustrated embodiment, the air-assisted conveying system 18 includes a supplemental air source 26. As discussed in detail below, the supplemental air source 26 may be activated in response to detection of a potential plugging condition in a line 22, thereby reducing the possibility of plugging in the line 22. In the illustrated embodiment, the supplemental air source 26 includes air pump(s) 28, tank(s) 30, and a valve assembly 32. For example, the supplemental air source may include 1, 2, 3, 4, 5, 6, or more air pumps, and/or the supplemental air source may include 1, 2, 3, 4, 5, 6, or more tanks. Each air pump 28 may be driven by one or more motor(s) (e.g., electric motor(s), pneumatic motor(s), hydraulic motor(s), etc.), and the pump(s) 28, which are fluidly coupled to the tank(s) 30, may output pressurized air to the tank(s) 30, which may store the pressurized air. The valve assembly 32 is fluidly coupled to the tank(s) 32 and to one or more conduits 34. Each conduit 34 is fluidly coupled to a line 22, thereby enabling supplemental air from the supplemental air source 26 to flow into the line 22. In the illustrated embodiment, three conduits 34 extend from the valve assembly 32 to each line 22 of the air-assisted conveying system 28. However, in other embodiments, more or fewer conduits may extend to each line. For example, in certain embodiments, 0, 1, 2, 3, 4, 5, 6, 7, 8, 9, 10, or more conduits may extend to each line. Furthermore, in certain embodiments, more conduits may extend to one line, and fewer conduits may extend to another line. The conduit(s) 34 may be fluidly coupled to each line 22 at any suitable location(s) along the line. For example, in certain embodiments, the outlets of the conduits 34 may be substantially equally spaced from one another along the line 22.

The supplemental air source 26 is configured to provide supplemental air to each line 22, thereby temporarily increasing the air flow through the line 22, which may reduce the possibility of plugging in the line 22. For example, the supplemental air source 26 may be activated by opening one or more valves of the valve assembly 32, thereby enabling supplemental air to flow from the tank(s) 30 to one or more lines 22 via respective conduit(s) 34. As the air pressure within the tank(s) 30 decreases, the pump(s) 28 may be automatically activated to increase the air pressure within the tank(s) 30. For example, in certain embodiments, the supplemental air source 26 may include a pressure sensor configured to monitor the air pressure within each tank 30. In response to the air pressure within the tank decreasing below a threshold value, the pump(s) 28 may be activated to increase the air pressure. Furthermore, in certain embodiments, the valve assembly 32 may include one valve for each conduit 34, thereby providing individual control of the supplemental air flow through the conduits 34. However, in other embodiments, the valve assembly 32 may include one valve for each group of conduits 34. The group of conduits 34 may include each conduit fluidly coupled to a respective line 22, thereby providing individual control of the supplemental air flow through the lines 22. In addition, in certain embodiments, the valve assembly 32 may include a single valve configured to selectively facilitate supplemental air flow through all of the conduits 34. Furthermore, at least one valve of the valve assembly 32 may be an open/close valve having only open and closed positions (e.g., each valve of the valve assembly may be an open/close valve), and/or at least one valve of the valve assembly 32 may be a control valve (e.g., proportional control valve) configured to vary the supplemental air flow rate through the valve (e.g., each valve of the valve assembly may be a control valve).

While the supplemental air source 26 includes the pump(s) 28, the tank(s) 30, and the valve assembly 32 in the illustrated embodiment, in other embodiments, at least one component of the supplemental air source may be omitted, and/or the supplemental air source may include additional component(s). For example, in certain embodiments, the tank(s) may be omitted, and the pump(s) may be directly fluidly coupled to the valve assembly. Furthermore, in certain embodiments, the tank(s) and the valve assembly may be omitted, and the pump(s) may be directly fluidly coupled to the conduit(s). For example, pump(s) may be selectively activated to provide a supplemental air flow through each conduit fluidly coupled to the activated pump(s). In certain embodiments, the supplemental air source 26 may include one pump 28 for each conduit 34, thereby providing individual control of the supplemental air flow through the conduits 34. However, in other embodiments, the supplemental air source may include one pump 28 for each group of conduits 34. The group of conduits 34 may include each conduit fluidly coupled to a respective line 22, thereby providing individual control of the supplemental air flow through the lines 22. In addition, in certain embodiments, the supplemental air source 26 may include a single pump 28 configured to selectively facilitate supplemental air flow through all of the conduits 34.

In the illustrated embodiment, the air-assisted conveying system 18 includes a controller 36 communicatively coupled to the operational air source 24 and to the supplemental air source 26. In certain embodiments, the controller 36 is an electronic controller having electrical circuitry configured to control the operational air source 24 and the supplemental air source 26. In the illustrated embodiment, the controller 36 includes a processor, such as the illustrated microprocessor 38, and a memory device 40. The controller 36 may also include one or more storage devices and/or other suitable component(s). The processor 38 may be used to execute software, such as software for controlling the operational air source 24 and the supplemental air source 26, and so forth. Moreover, the processor 38 may include multiple microprocessors, one or more "general-purpose" microprocessors, one or more special-purpose microprocessors, and/or one or more application specific integrated circuits (ASICs), or some combination thereof. For example, the processor 38 may include one or more reduced instruction set (RISC) processors.

The memory device 40 may include a volatile memory, such as random access memory (RAM), and/or a nonvolatile memory, such as read-only memory (ROM). The memory device 40 may store a variety of information and may be used for various purposes. For example, the memory device 40 may store processor-executable instructions (e.g., firmware or software) for the processor 38 to execute, such as instructions for controlling the operational air source 24 and the supplemental air source 26, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the operational air source 24 and the supplemental air source 26, etc.), and any other suitable data.

In the illustrated embodiment, the air-assisted conveying system 18 includes a user interface 42 communicatively coupled to the controller 36. The user interface 42 is configured to receive input from an operator and to provide information to the operator. The user interface 42 may include any suitable input device(s) for receiving input, such as a keyboard, a mouse, button(s), switch(es), knob(s), other suitable input device(s), or a combination thereof. In addition, the user interface 42 may include any suitable output device(s) for presenting information to the operator, such as speaker(s), indicator light(s), other suitable output device(s), or a combination thereof. In the illustrated embodiment, the user interface 42 includes a display 44 configured to present visual information to the operator. In certain embodiments, the display 44 may include a touchscreen interface configured to receive input from the operator.

In certain embodiments, the controller 36 is configured to determine an initial operational air flow rate based on an agricultural product flow rate through the line(s) 22 and a ground speed of the agricultural system. Furthermore, in certain embodiments, the controller 36 is configured to receive the initial operational air flow rate (e.g., from the user interface 42). During operation of the agricultural system, the controller 36 is configured to control the operational air source 24 to output the initial operational air flow rate.

Furthermore, the air-assisted conveying system 18 includes pressure sensors fluidly coupled to at least one line 22. In the illustrated embodiment, the air-assisted conveying system 18 includes a first pressure sensor 46 fluidly coupled to a line 22 at a first location along the line 22, and the first pressure sensor 46 is configured to output a first sensor signal indicative of a first air pressure within the line 22 at the first location. Furthermore, the air-assisted conveying system 18 includes a second pressure sensor 48 fluidly coupled to the line 22 at a second location along the line 22, and the second pressure sensor 48 is configured to output a second sensor signal indicative of a second air pressure within the line 22 at the second location. In addition, the air-assisted conveying system 18 includes a third pressure sensor 50 fluidly coupled to the line 22 at a third location along the line 22, and the third pressure sensor 50 is configured to output a third sensor signal indicative of a third air pressure within the line 22 at the third location. Each pressure sensor may include any suitable device(s) configured to monitor air pressure within the line, such as a piezoelectric pressure sensor, a capacitive pressure sensor, etc. Furthermore, as used herein, "air pressure" refers to a static air pressure (e.g., pressure that is not associated with the motion of the air).

In the illustrated embodiment, the first location is positioned proximate to an outlet 52 of the line 22, and the second location is positioned proximate to an inlet 54 of the line 22. Furthermore, the third location is positioned between the first location and the second location along the line. However, in other embodiments, each location may be positioned at any suitable position along the line. Furthermore, while three pressure sensors are fluidly coupled to the line 22 in the illustrated embodiment, in other embodiments, more or fewer pressure sensors may be coupled to the line (e.g., 2, 4, 5, 6, or more). For example, in certain embodiments, the third pressure sensor may be omitted. In addition, while the pressure sensors are fluidly coupled to a single line in the illustrated embodiment, in other embodiments, pressure sensors may be fluidly coupled to multiple lines. For example, multiple pressure sensors may be fluidly coupled to each line of the air-assisted conveying system.

In certain embodiments, the controller 36 is configured to receive the first sensor signal indicative of the first air pressure at the first location within the line 22, and the controller 36 is configured to receive the second sensor signal indicative of the second air pressure within the line 22. Furthermore, the controller 36 is configured to determine an air pressure differential based on the first air pressure and the second air pressure. For example, the controller 36 may be configured to subtract the first air pressure from the second air pressure to determine the air pressure differential. As previously discussed, in certain embodiments, the first location is positioned proximate to the outlet 52 of the line 22, and the second location is positioned proximate to the inlet 54 of the line 22. Accordingly, the air pressure differential corresponds to the air pressure differential across a substantial portion of the line 22. However, in certain embodiments, each location may be positioned at any suitable position along the line.

In addition, the controller 36 is configured to compare the pressure differential to a threshold value. The threshold value may correspond to a pressure differential associated with an impending plugging condition. The impending plugging condition may correspond to an operating condition (e.g., with insufficient air flow) that has a substantial potential to ultimately result in plugging (e.g., a buildup of agricultural product within the line). The controller 36 is configured to control the supplemental air source 26 (e.g., the pump(s) 28 and/or the valve assembly 32) to provide the supplemental air to the line 22 for a supplemental air duration in response to determining the air pressure differential is greater than the threshold value. Furthermore, the controller 36 is configured to control the operational air source 24 to increase the operational air flow through the line 22 (e.g., via increasing the speed of the blower) in response to determining the air pressure differential is greater than the threshold value during the supplemental air duration. Accordingly, if the supplemental air provided by the supplemental air source 26 is insufficient to establish a pressure differential that is less than or equal to the threshold value, the operational air flow provided by the operational air source 24 is increased. By increasing the air flow through the line 22 (e.g., via the supplemental air flow alone or in combination with the increased operational air flow), the possibility of plugging within the line 22 may be substantially reduced or eliminated, thereby enhancing the effectiveness of the agricultural system.

The threshold value may be represented as a pressure value (e.g., in pounds per square inch (psi), Pascals, bar, etc.) or as a percentage of the second air pressure (e.g., the highest air pressure). For example, the threshold value may be 2 to 50 psi, 5 to 25 psi, or 10 to 15 psi. By way of further example, the threshold value may be 25 percent of the second air pressure, 20 percent of the second air pressure, 15 percent of the second air pressure, 10 percent of the second air pressure, or 5 percent of the second air pressure. The threshold value may be manually input via the user interface 42, and/or the threshold value may be determined by the controller 36. In certain embodiments, the controller 36 may determine the threshold value via machine learning. For example, if the air pressure differential is less than or equal to an original threshold value (e.g., input via the user interface), but plugging is detected (e.g., based on input to the user interface), the controller may store the air pressure differential(s) for the period before the plugging is detected. The controller may use these air pressure differential(s) (e.g., in combination with other air pressure differential(s) determined before plugging is detected, such as during other instances of plugging during operation of the agricultural system and/or during instances of plugging during operation of other agricultural system(s)) to train the machine learning process. The controller may then determine a threshold value that substantially reduces or eliminates the possibility of plugging using the machine learning process. In certain embodiments, the machine learning process may generate different threshold values (e.g., as represented by table(s), empirical formula(s), curve fit(s), etc.) that vary based on agricultural product type, environmental conditions, system configuration, or a combination thereof. Furthermore, in certain embodiments, the controller may be configured to determine the threshold value based on one or more parameters, such as the type of agricultural product, the moisture content of the agricultural product, the system configuration, the environmental conditions, other suitable parameter(s), or a combination thereof.

Furthermore, the supplemental air duration may be selected and/or determined. For example, the supplemental air duration may be input into the user interface 42, and/or the supplemental air duration may be determined by the controller 36 (e.g., based on the flow rate of the agricultural product through the line(s) 22, the moisture content of the agricultural product, the system configuration, the environmental conditions, other suitable parameter(s), or a combination thereof). The supplemental air duration may be 1 second, 2 seconds, 3 seconds, 4 seconds, 5 seconds, 6 seconds, 7 seconds, 8 seconds, 9 seconds, 10 seconds, 15 seconds, 20 seconds, 30 seconds, 40 seconds, or one minute.

In certain embodiments, the controller 36 is configured to receive the third sensor signal indicative of the third air pressure at the third location within the line 22. In such embodiments, the controller 36 may be configured to determine the air pressure differential based on the first air pressure, the second air pressure, and the third air pressure. For example, the controller may determine the air pressure differential by subtracting the first air pressure from the third air pressure to establish a first pressure change and by subtracting the second air pressure from the third air pressure to establish a second pressure change. The controller may set the pressure differential to a maximum of the pressure changes or to a minimum of the pressure changes, or the controller may average the pressure changes to establish the pressure differential. In embodiments with additional monitored pressures along the line, the controller may determine the pressure differential in the same manner (e.g., the minimum of the pressure changes, the maximum of the pressure changes, or the average of the pressure changes). Furthermore, in certain embodiments, the controller may use another suitable technique to determine the pressure differential based on the monitored air pressures (e.g., median of pressure changes, curve fit of monitored air pressures, etc.).

In certain embodiments, the controller 36 is configured to average at least one air pressure (e.g., each air pressure) over a period of time before determining the air pressure differential. For example, the controller 36 may be configured to receive sensor signals from at least one sensor (e.g., each sensor) at a sample rate, and the controller 36 may average the respective air pressures over a period of time that is greater than the inverse of the sample rate. By way of example, the sample rate may be 10 Hz, and the controller may average the air pressures over one second, such that 10 air pressures are averaged. Accordingly, in certain embodiments, the controller may determine the pressure differential based on an average of the first air pressure over a time period, an average of the second air pressure over the time period, and, in certain embodiments, an average of the third air pressure over the time period. However, in other embodiments, only a portion of the air pressures may be averaged (e.g., one or more), or no air pressures may be averaged (e.g., the controller may determine the air pressure differential based on each individual air pressure measurement).

In certain embodiments, controlling the operational air source 24 to increase the operational air flow includes iteratively increasing the operational air flow (e.g., speed of the blower) until the air pressure differential is less than or equal to the threshold value or a maximum number of iterations is reached. For example, if increasing the operational air flow through the line 22 is insufficient to terminate the impending plugging condition, the controller 36 may continue to increase the operational air flow until the air pressure differential is less than or equal to the threshold value. However, after a maximum number of iterations, the controller 36 may terminate the process of increasing the operational air flow through the line. In certain embodiments, the controller is configured to increase the operational air flow in fixed increments. For example, the controller may be configured to increase the speed of the blower of the operational air source by a fixed rotational speed increment (e.g., 50 RPM, 75 RPM, 100 RPM, 150 RPM, 200 RPM, etc.). Furthermore, in certain embodiments, the controller is configured to increase the operational air flow in variable increments. For example, the controller may determine the increment based on the pressure differential (e.g., a higher increment for a higher pressure differential and a lower increment for a lower pressure differential). In addition, the maximum number of iterations may be set to any suitable value, such as 1, 2, 3, 4, 5, 6, 7, 8, or more (e.g., depending on the magnitude of the increment). For example, in certain embodiments, the maximum number of iterations may be 1, such that the controller only increases the operational air flow once (e.g., the operational air flow is not iteratively increased).

In certain embodiments, the controller 36 is configured to control the supplemental air source 26 (e.g., the pump(s) 28 and/or the valve assembly 32) to provide the supplemental air for the supplemental air duration in response to each increase of the operational air flow. Accordingly, the air flow through the line 22 may include the combination of the supplemental air flow of the supplemental air and the increased operational air flow. As a result, the possibility of establishing a pressure differential that is less than or equal to the threshold value may be greater than increasing the operational air flow alone (e.g., without providing the supplemental air). However, in other embodiments, the supplemental air may not be provided in response to each increase in the operational air flow.

In the illustrated embodiment, the controller 36 is communicatively coupled to a speed control system 56, which is configured to control a ground speed of the agricultural system. The speed control system 56 may include an engine output control system and/or a transmission control system. The engine output control system is configured to vary the output of an engine to control the speed of the agricultural system. For example, the engine output control system may vary a throttle setting of the engine, a fuel/air mixture of the engine, a timing of the engine, other suitable engine parameters, or a combination thereof, to control engine output. In addition, the transmission control system may adjust a gear ratio within a transmission to control the speed of the agricultural system. For example, the transmission control system may adjust the gear ratio by adjusting gear selection in a transmission with discrete gears, or the transmission control system may adjust the gear ratio by controlling a continuously variable transmission (CVT). In certain embodiments, the speed control system may include other suitable system(s) (e.g., alone or in combination with the system(s) disclosed above) to facilitate adjusting the speed of the agricultural system, such as an electric motor controller for an electric motor.

In certain embodiments, the controller 36 is configured to control the speed control system 56 to decrease the ground speed of the agricultural system in response to the maximum number of iterations being reached. Reaching the maximum number of iterations may indicate that an air flow increase alone may be insufficient to terminate the impending plugging condition. Accordingly, the controller 36 may decrease the ground speed of the agricultural system, thereby reducing the flow rate of the agricultural product through the lines 22. As a result, the operational air flow (e.g., alone or in combination with the supplemental air flow) may be sufficient to establish a pressure differential that is less than or equal to the threshold value, thereby terminating the impending plugging condition.

In certain embodiments, controlling the speed control system 56 to decrease the ground speed of the agricultural system includes iteratively decreasing the ground speed until the air pressure differential is less than or equal to the threshold value. For example, if decreasing the ground speed of the agricultural system is insufficient to terminate the impending plugging condition, the controller 36 may continue to decrease the ground speed until the air pressure differential is less than or equal to the threshold value. In certain embodiments, the controller is configured to decrease the ground speed in fixed increments (e.g., 0.25 km/hr, 0.5 km/hr, 0.75 km/hr, 1 km/hr, 1.25 km/hr, etc.) or in fixed percentages (e.g., 5 percent, 10 percent, 15 percent, etc.). Furthermore, in certain embodiments, the controller is configured to decrease the ground speed in variable increments/percentages. For example, the controller may determine the increment/percentage based on the pressure differential (e.g., a higher increment/percentage for a higher pressure differential and a lower increment/percentage for a lower pressure differential). In certain embodiments, the controller may implement a delay (e.g., 10 seconds, 30 seconds, 1 minute, 2 minutes, etc.) between decreasing the ground speed and comparing the air pressure differential to the threshold value. As a result, the agricultural system may reach a steady state condition before the air pressure differential comparison. Furthermore, in certain embodiments, the controller may determine that a maximum number of ground speed decreases has been reached (e.g., the ground speed has decreased below a speed sufficient to harvest the agricultural product in a reasonable amount of time) and, in response, the controller may terminate the ground speed decreases and control the user interface to present and indication to the operator indicative of the status/condition. While iteratively decreasing the ground speed of the agricultural system is disclosed above, in certain embodiments, the controller may only decrease the ground speed once (e.g., the ground speed may not be iteratively decreased).

In certain embodiments, the controller 36, after controlling the speed control system to decrease the ground speed (e.g., iteratively decrease the ground speed) such that the air pressure differential is less than or equal to the threshold value, is configured to iteratively decrease the operational air flow until the air pressure differential is greater than a second threshold value. For example, the controller 36 may control the operational air source 24 to iteratively decrease the operational air flow. As previously discussed, due to the decrease in ground speed, the agricultural product flow rate through the lines 22 may be reduced. Accordingly, the operational air flow may be reduced to provide a target air flow rate for the flow rate of the agricultural product. The air pressure differential increasing above the second threshold value may indicate that the operational air flow does not have a flow rate substantially greater than the target air flow rate. The second threshold value may be less than the threshold value disclosed above, such that the air pressure differential is between the threshold value and the second threshold value after the operational air flow is decreased. In addition, the second threshold value may be represented as a pressure value (e.g., in pounds per square inch (psi), Pascals, bar, etc.) or as a percentage of the second air pressure (e.g., the highest air pressure).

In each instance in which the controller 36 compares the air pressure differential to a threshold value (e.g., the threshold value or the second threshold value), the controller may determine the air pressure differential based on the air pressures, as disclosed above. In certain embodiments, after each adjustment to the operational air flow and/or activation of the supplemental air source, the controller 36 may wait a period of time (e.g., delay) before comparing the air pressure differential to a threshold value (e.g., the threshold value or the second threshold value), thereby enabling the air flow to reach a substantially steady state before the comparison. The delay may be 1 second, 2 seconds, 5 seconds, 10 seconds, or any other suitable time period. While the controller 36 is configured to control the supplemental air source 26 and the speed control system 56 based on the air pressure differential in the embodiments disclosed above, in certain embodiments, the controller may be configured to control one of the supplemental air source (e.g., in embodiments in which the speed control system is omitted) or the speed control system (e.g., in embodiments in which the supplemental air source is omitted).

Furthermore, in certain embodiments, the controller 36 may control the speed control system 56 to increase the ground speed of the agricultural system a period of time (e.g., delay) after decreasing the ground speed or decreasing the operational air flow. For example, the controller 36 may control the speed control system 56 to increase the ground speed (e.g., in one or more steps/increments) to an initial ground speed (e.g., the ground speed of the agricultural system before the ground speed decreased). After increasing the ground speed to the initial ground speed, the process of controlling the operational air source and at least one of the supplemental air source or the speed control system may be performed.

In certain embodiments, the controller 36 is configured to control the supplemental air source 26 (e.g., the valve assembly 32 and/or the pump(s) 28) to control the flow of the supplemental air to different sections of the line 22 in response to activation of the supplemental air source 26. As previously discussed, multiple conduits 34 may extend between the supplemental air source 26 and the line 22. In addition, each conduit 34 may be fluidly coupled to a respective section of the line 22. In certain embodiments, the controller 36 is configured to determine a location of the impending plugging condition within the line 22 based on feedback from the pressure sensors. In such embodiments, the controller 36 may control the supplemental air source 26 to provide the supplemental air to the conduit 34 fluidly coupled to the line 22 at the section corresponding to the location of the impending plugging condition. Furthermore, in certain embodiments, the controller may control the supplemental air source to provide the supplemental air to each conduit, and to provide a higher flow rate of the supplemental air to the conduit fluidly coupled to the line at the section corresponding to the location of the impending plugging condition. In other embodiments, the controller may not determine the location of the impending plugging condition, and the controller may control the supplemental air source to provide the same flow rate of the supplemental air to each conduit.

Furthermore, in certain embodiments, the controller 36 may control the supplemental air source 26 (e.g., the valve assembly 32 and/or the pump(s) 28) to control the flow rate of the supplemental air. For example, in embodiments in which the supplemental air source 26 includes the valve assembly 32 with control valve(s), the controller 36 may control valve(s) of the valve assembly 32 based on the pressure differential to establish target supplemental air flow rate(s). Furthermore, in embodiments in which the valve assembly and the tank(s) are omitted, the controller 36 may control the pump(s) based on the pressure differential to establish target supplemental air flow rate(s).

In certain embodiments, the process of controlling the operational air source and at least one of the supplemental air source or the speed control system based on the determined pressure differential may be performed for multiple lines. For example, in certain embodiments, the air-assisted conveying system 18 includes multiple lines 22, and the pressure sensors are fluidly coupled to a single line. In such embodiments, the controller may determine a single air pressure differential for the monitored line and control the operational air source and at least one of the supplemental air source or the speed control system based on the single air pressure differential. For example, in embodiments in which the operational air source has a single blower that provides the operational air to the lines, the controller may control the single blower. Furthermore, in embodiments in which the operational air source has a blower for each line, the controller may control the blowers to provide the same operational air flow to each line. In addition, in embodiments in which the supplemental air source includes a single valve that controls supplemental air flow to the conduits, the controller may control the single valve to provide the same supplemental air flow to each conduit. In embodiments in which the supplemental air source includes multiple valves, the controller may control the valves to provide the same supplemental air flow to each conduit (e.g., such that the same supplemental air flow is provided to each section of each line), or the controller may control the valves to provide the same supplemental air flow to a respective section of each line (e.g., as discussed above with regard to providing the supplemental air to the section with the impending plugging condition). Furthermore, in embodiments in which the supplemental air source includes a single pump and no valve assembly/tank(s), the controller may control the single pump to provide the supplemental air flow to each conduit. In embodiments in which the supplemental air source includes multiple pumps and no valve assembly/tank(s), the controller may control the pumps to provide the same supplemental air flow to each conduit.

In certain embodiments, the air-assisted conveying system 18 includes multiple lines 22, and the pressure sensors are fluidly coupled to multiple lines (e.g., all of the lines). In such embodiments, the controller may determine multiple air pressure differentials for the monitored lines and control the operational air source and at least one of the supplemental air source or the speed control system based on the multiple air pressure differentials. In embodiments in which the operational air source has a blower for each line, the controller may control each blower based on the pressure differential within a respective line. For example, the controller may only increase the operational air flow to the line(s) in which the air pressure differential is greater than the threshold value. In embodiments in which the supplemental air source includes multiple valves, the controller may control the valve(s) associated with each line based on the pressure differential within the line. For example, the controller may open the valve(s) associated with the line(s) in which the air pressure differential is greater than the threshold value. Furthermore, as discussed above with regard to providing the supplemental air to the section with the impending plugging condition, the controller may control the valves associated with each line in which the pressure differential is greater than the threshold value to provide the supplemental air flow to the section having the impending plugging condition. In addition, in embodiments in which the supplemental air source includes multiple pumps and no valve assembly/tank(s), the controller may control the pump(s) associated with each line based on the pressure differential within the line. For example, the controller may control the pump(s) to provide the supplemental air to the line(s) in which the air pressure differential is greater than the threshold value. Furthermore, as discussed above with regard to providing the supplemental air to the section with the impending plugging condition, the controller may control the pumps associated with each line in which the pressure differential is greater than the threshold value to provide the supplemental air flow to the section having the impending plugging condition. Furthermore, with regard to controlling the speed control system, the controller may control the speed control system to decrease the ground speed in response to the pressure differential in any of the lines being greater than the threshold value.

Figure 3:
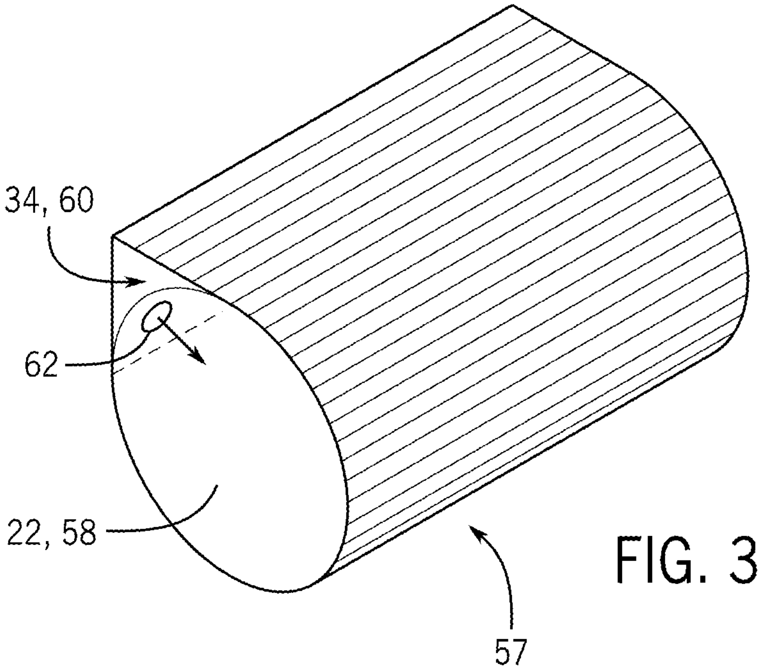
FIG. 3 is a perspective view of an embodiment of a portion of a line assembly that may be employed within the air-assisted conveying system of FIG. 2.

FIG. 3 is a perspective view of an embodiment of a portion of a line assembly 57 that may be employed within the air-assisted conveying system of FIG. 2. In the illustrated embodiment, the line assembly 57 includes a primary passage 58 configured to facilitate flow of the operational air, and the line assembly 57 includes a secondary passage 60 configured to facilitate flow of the supplemental air. In the illustrated embodiment, the primary passage 58 corresponds to a line 22 disclosed above with reference to FIG. 2, and the secondary passage 60 corresponds to a conduit 34 disclosed above with reference to FIG. 2. An outlet 62 of the secondary passage 60 facilitates flow of the supplemental air into the operational air flow through the primary passage 58. In certain embodiments, the line assembly 57 includes multiple separate secondary passages 60 corresponding to the multiple conduits 34 disclosed above with reference to FIG. 2. Accordingly, flow of the supplemental air to each portion of the primary passage 58/line 22 may be independently controlled. Furthermore, in certain embodiments, the line assembly 57 may include a single secondary passage 60 with multiple outlets 62 disposed along the secondary passage 60/primary passage 58. Accordingly, the supplemental air may be provided to multiple locations along the primary passage 58/line 22. While the line assembly 57 includes the primary passage 58 and the secondary passage 60 in the illustrated embodiment, in other embodiments, the line assembly may have other suitable structures, such as multiple conduits extending to a line, in which the operational air flows through the line and the conduits provide the supplemental air to the line. In embodiments in which the air-assisted conveying system includes multiple lines, the air-assisted conveying system may include the same type of line assembly, such as the line assembly of FIG. 3, or the air-assisted conveying system may include different types of line assemblies.

Figure 4:
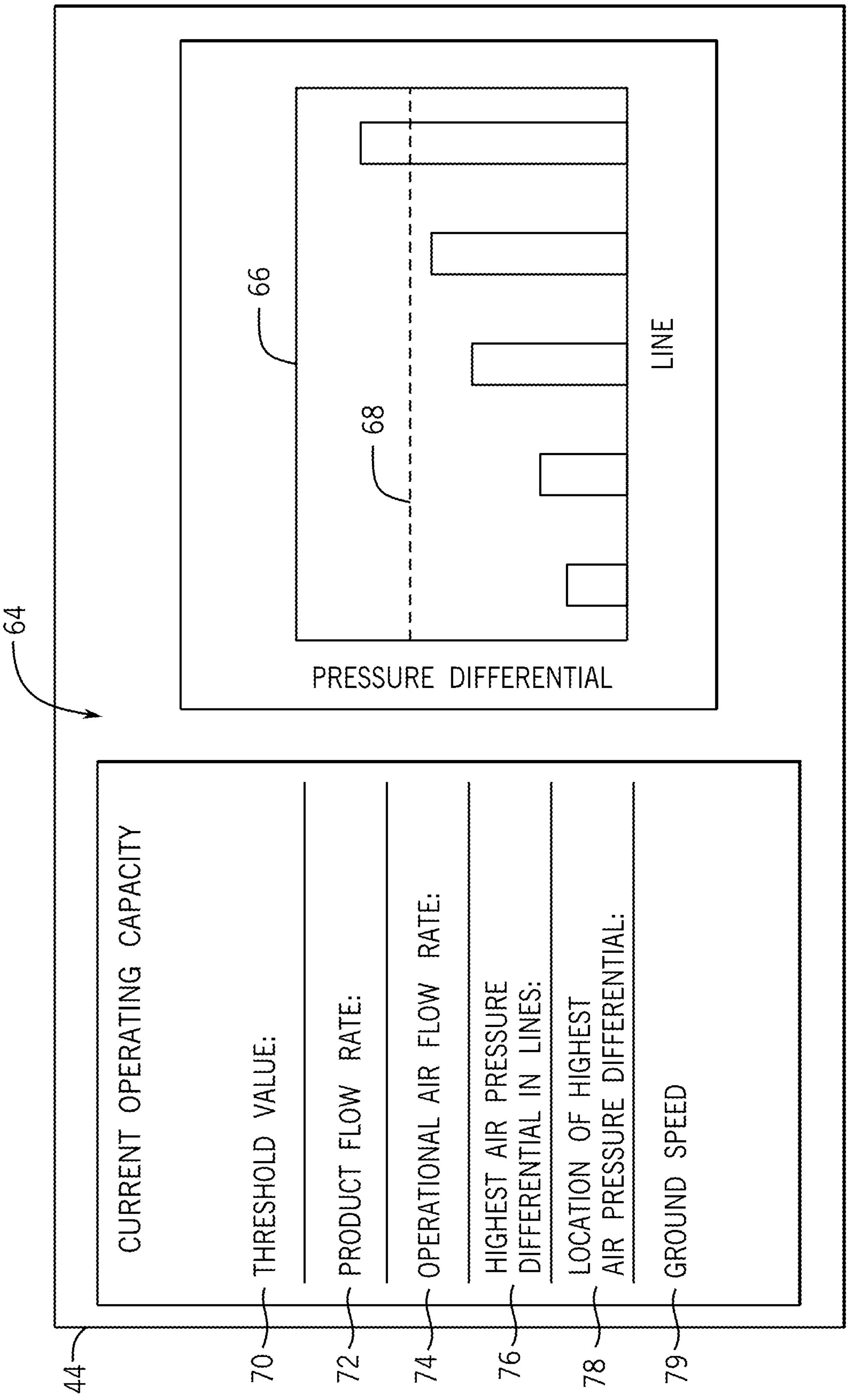
FIG. 4 is a view of an embodiment of a visual representation of data that may be presented on a display of the air-assisted conveying system of FIG. 2.

FIG. 4 is a view of an embodiment of a visual representation of data 64 that may be presented on the display 44 of the air-assisted conveying system of FIG. 2. In the illustrated embodiment, the data 64 includes a bar graph 66 of the air pressure drops within the lines. The graph 66 includes a dashed line 68 representing the threshold value. In the illustrated embodiment, the air-assisted conveying system includes five lines, and the air pressure differential within four of the lines is less than the threshold value. However, the air pressure differential within one line is greater than the threshold value. The graph 66 may enable an operator to readily identify a line having an air pressure differential greater than the threshold value. In certain embodiments, the controller may control the display to change the color of the bar(s) that extend beyond the dashed line 68, thereby providing an additional indication to the operator of the line(s) in which an air pressure differential is greater than the threshold value. While the data 64 includes the graph 66 in the illustrated embodiment, in other embodiments, the graph may be omitted.

Furthermore, in the illustrated embodiment, the data 64 includes numerical values indicative of the threshold value 70, the agricultural product flow rate 72, the operational air flow rate 74 (e.g., output of the operational air source), the highest air pressure differential among the lines 76 (e.g., the air pressure differential of the single monitored line in embodiments in which only one line is monitored), the location of the highest air pressure differential in the lines 78, and the ground speed 79. In other embodiments, at least one of the numerical values may be omitted and/or at least one additional numerical value may be provided (e.g., the second threshold value, the lowest air pressure differential in the lines, etc.). Furthermore, in certain embodiments, the numerical values may be omitted.

Figure 5:
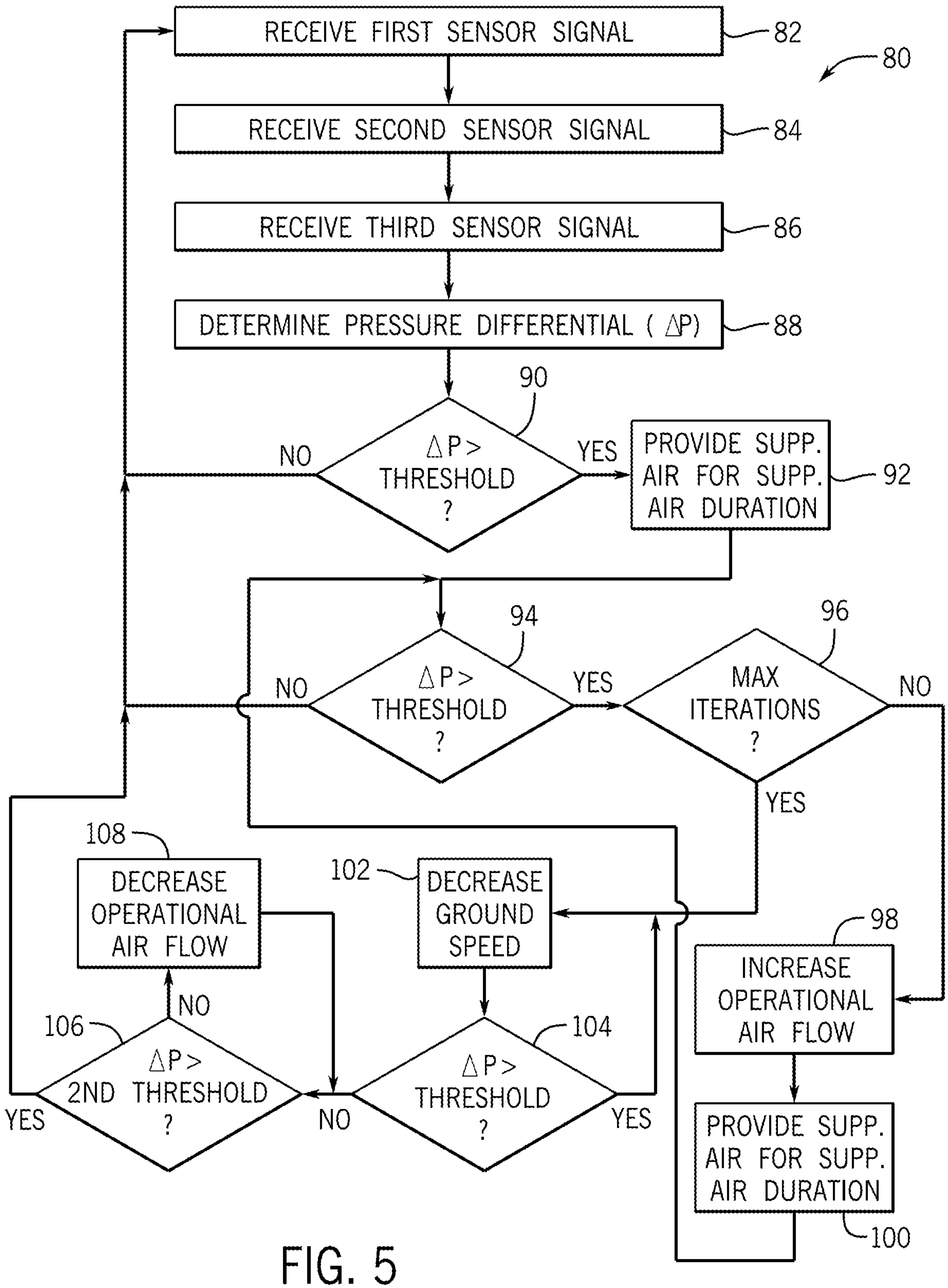
FIG. 5 is a flow diagram of an embodiment of a method for controlling an air-assisted conveying system.

FIG. 5 is a flow diagram of an embodiment of a method 80 for controlling an air-assisted conveying system. The method 80 may be performed by the controller disclosed above with referenced to FIG. 2 or any other suitable controller(s). Furthermore, the steps of the method 80 may be performed in the order disclosed herein or in any other suitable order. For example, certain steps of the method may be performed concurrently. In addition, in certain embodiments, at least one of the steps of the method 80 may be omitted.

The method 80 includes receiving a first sensor signal indicative of a first air pressure at a first location within a line of the air-assisted conveying system, as represented by block 82. As previously discussed, the first sensor signal may be received from a first pressure sensor fluidly coupled to the line at the first location. In addition, the method 80 includes receiving a second sensor signal indicative of a second air pressure at a second location within the line of the air-assisted conveying system, as represented by block 84. As previously discussed, the second sensor signal may be received from a second pressure sensor fluidly coupled to the line at the second location. Furthermore, in certain embodiments, the method 80 includes receiving a third sensor signal indicative of a third air pressure at a third location within the line of the air-assisted conveying system, as represented by block 86. As previously discussed, the third sensor signal may be received from a third pressure sensor fluidly coupled to the line at the third location. As represented by block 88, an air pressure differential is determined based on the first air pressure and the second air pressure, and in certain embodiments, the third air pressure. As previously discussed with respect to FIG. 2, any suitable technique may be used to determine the pressure differential based on the monitored air pressures.

As represented by block 90, the air pressure differential is compared to a threshold value. As previously discussed, the threshold value may correspond to a pressure differential associated with an impending plugging condition. The impending plugging condition may correspond to an operating condition (e.g., with insufficient air flow) that has a substantial potential to ultimately result in plugging (e.g., a buildup of agricultural product within the line). In response to determining the air pressure differential is greater than the threshold value, the supplemental air source (e.g., the pump(s) and/or the valve assembly) is controlled to provide the supplemental air to the line for a supplemental air duration, as represented by block 92. As previously discussed, the supplemental air duration may be input into the user interface, and/or the supplemental air duration may be determined (e.g., based on the flow rate of the agricultural product through the line, the moisture content of the agricultural product, the system configuration, the environmental conditions, other suitable parameter(s), or a combination thereof).

Furthermore, as represented by block 94, the air pressure differential is compared to the threshold value during the supplemental air duration. In response to determining the air pressure differential is not greater than the threshold value during the supplemental air duration, the method returns to block 82. However, in response to determining the air pressure differential is greater than the threshold value during the supplemental air duration, an iteration number is compared to a maximum number of iterations, as represented by block 96. As previously discussed, the maximum number of iterations may be set to any suitable value, such as 1, 2, 3, 4, 5, 6, 7, 8, or more. In response to determining that the iteration number is less than the maximum number of iterations, the operational air source is controlled to increase the operational air flow through the line (e.g., via increasing the speed of the blower), as represented by block 98. In certain embodiments, the supplemental air source may be controlled to provide the supplemental air for the supplemental air duration in response to the increase in the operational air flow, as represented by block 100. Accordingly, the air flow through the line may be the combination of the supplemental air flow of the supplemental air and the increased operational air flow. However, in certain embodiments, the supplemental air may not be provided in response to the increase in the operational air flow.

The method then returns to block 94, in which the air pressure differential is compared to the threshold value (e.g., during the supplemental air duration). The process of increasing the operational air flow and, in certain embodiments, providing the supplemental air for the supplemental air duration iteratively repeats until the air pressure differential is less than or equal to the threshold value or the maximum number of iterations is reached. If the air pressure differential is less than or equal to the threshold value, the method returns to block 82. Furthermore, if the maximum number of iterations is reached, the method proceeds to block 102, in which the speed control system is controlled to decrease the ground speed of the agricultural system. In certain embodiments, the maximum number of iterations may be one, such that only a single iteration of the process of increasing the operational air flow and, in certain embodiments, providing the supplemental air for the supplemental air duration is performed.

As previously discussed, decreasing the ground speed, as represented by block 102, reduces the flow rate of the agricultural product through the line. As a result, the operational air flow (e.g., alone or in combination with the supplemental air flow) may be sufficient to establish a pressure differential that is less than or equal to the threshold value, thereby terminating the impending plugging condition. In certain embodiments, the process of decreasing the ground speed is performed iteratively. In such embodiments, the air pressure differential is compared to the threshold value, as represented by block 104, after the ground speed is decreased. If the air pressure differential is greater than the threshold value, the process of decreasing the ground speed is iteratively performed until the air pressure differential is less than or equal to the threshold value. As previously discussed, in certain embodiments, a delay (e.g., 10 seconds, 30 seconds, 1 minute, 2 minutes, etc.) may be implemented between decreasing the ground speed and comparing the air pressure differential to the threshold value. As a result, the agricultural system may reach a steady state condition before the air pressure differential comparison. Furthermore, in certain embodiments, in response to determining that a maximum number of ground speed decreases has been reached (e.g., the ground speed has decreased below a speed sufficient to harvest the agricultural product in a reasonable amount of time), the process of decreasing the ground speed terminates and the user interface is controlled to present and indication to the operator indicative of the status/condition. While iteratively decreasing the ground speed of the agricultural system is disclosed above, in certain embodiments, the ground speed may only be decreased once (e.g., the ground speed may not be iteratively decreased).

In response to determining that the air pressure differential is less than or equal to the threshold value, the method proceeds to block 106, in which the air pressure differential is compared to a second threshold value. The second threshold value may be determined based on a target air flow rate for the flow rate of the agricultural product. For example, air flow through the line at the target air flow rate may establish a target air pressure differential. In certain embodiments, the second threshold value may be set to the target air pressure differential. Accordingly, the air pressure differential increasing above the second threshold value may indicate that the operational air flow does not have a flow rate substantially greater than the target air flow rate. In response to determining that the air pressure differential is less than or equal to the second threshold value, the operational air source is controlled to decrease the operational air flow (e.g., via decreasing the speed of the blower), as represented by block 108. The process of decreasing the operational air flow may be iteratively performed until the air pressure differential is greater than the second threshold value. Accordingly, the operational air flow may be reduced to substantially provide the target air flow rate for the flow rate of the agricultural product. However, in certain embodiments, the process of iteratively decreasing the operational air flow may be omitted.

In each instance in which the air pressure differential is compared to a threshold value (e.g., the threshold value or the second threshold value), the air pressure differential may be determined based on the air pressures, as disclosed above. In certain embodiments, after each adjustment to the operational air flow and/or activation of the supplemental air source, a delay may be implemented before comparing the air pressure differential to a threshold value (e.g., the threshold value or the second threshold value), thereby enabling the air flow to reach a substantially steady state before the comparison. The delay may be 1 second, 2 seconds, 5 seconds, 10 seconds, or any other suitable time period. While the supplemental air source and the speed control system are controlled based on the air pressure differential in the embodiments disclosed above, in certain embodiments, only one of the supplemental air source or the speed control system may be controlled. For example, in certain embodiments, the steps of controlling the supplemental air source, as represented by blocks 92 and 100, may be omitted, or the step of controlling the speed control system, as represented by block 102, may be omitted.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An air-assisted conveying system of an agricultural harvester, comprising:

a controller comprising a memory and a processor, wherein the controller:

receives a first sensor signal indicative of a first air pressure at a first location within a line of the air-assisted conveying system;

receives a second sensor signal indicative of a second air pressure at a second location within the line of the air-assisted conveying system;

determines an air pressure differential based on the first air pressure and the second air pressure;

in response to determining that the air pressure differential is greater than a threshold value:

controls a supplemental air source that provides supplemental air to the line for a supplemental air duration; and in response to the determining that the air pressure differential is greater than the threshold value during the supplemental air duration, controls an operational air source that iteratively increases an operational air flow through the line during a plurality of iterations;

wherein the plurality of iterations comprises an initial iteration and one or more successive iterations, and wherein an operational air flow of each of the one or more successive iterations is greater than an operational air flow of a preceding iteration of the plurality of iterations.

2. The air-assisted conveying system of claim 1, wherein the controls the operational air source that iteratively increases the operational air flow comprises iteratively increasing the operational air flow until the air pressure differential is less than or equal to the threshold value or a maximum number of iterations is reached.

3. The air-assisted conveying system of claim 2, wherein the controller controls the supplemental air source in providing the supplemental air for the supplemental air duration in response to each increase of the operational air flow.

4. The air-assisted conveying system of claim 2, wherein the controller further controls a speed control system that decreases a ground speed of the agricultural harvester in response to the maximum number of iterations being reached.

5. The air-assisted conveying system of claim 4, wherein the controls the speed control system that decreases the ground speed comprises iteratively decreasing the ground speed until the air pressure differential is less than or equal to the threshold value.

6. The air-assisted conveying system of claim 4, wherein the controller, after the controls the speed control system that decreases the ground speed, then iteratively decreases the operational air flow until the air pressure differential is greater than a second threshold value.

7. The air-assisted conveying system of claim 1, wherein the controller further receives a third sensor signal indicative of a third air pressure at a third location within the line of the air-assisted conveying system, and the controller determines the air pressure differential based on the first air pressure, the second air pressure, and the third air pressure.

8. A method, comprising:

receiving, via a controller comprising a memory and a processor, a first sensor signal indicative of a first air pressure at a first location within a line of an air-assisted conveying system of an agricultural harvester;

receiving, via the controller, a second sensor signal indicative of a second air pressure at a second location within the line of the air-assisted conveying system;

determining, via the controller, an air pressure differential based on the first air pressure and the second air pressure;

in response to determining that the air pressure differential is greater than a threshold value:

controlling, via the controller, a supplemental air source that provides supplemental air to the line for a supplemental air duration; and in response to the determining that the air pressure differential is greater than the threshold value during the supplemental air duration, controlling, via the controller, an operational air source that iteratively increases an operational air flow through the line during a plurality of iterations;

wherein the plurality of iterations comprises an initial iteration and one or more successive iterations, and wherein an operational air flow of each of the one or more successive iterations is greater than an operational air flow of a preceding iteration of the plurality of iterations.

9. The method of claim 8, wherein the controlling the operational air source that iteratively increases the operational air flow comprises iteratively increasing the operational air flow until the air pressure differential is less than or equal to the threshold value or a maximum number of iterations is reached.

10. The method of claim 9, further comprising controlling, via the controller, the supplemental air source in providing the supplemental air for the supplemental air duration in response to each increase of the operational air flow.

11. The method of claim 9, further comprising controlling, via the controller, a speed control system that decreases a ground speed of the agricultural harvester in response to the maximum number of iterations being reached.

12. The method of claim 11, wherein the controlling the speed control system that decreases the ground speed comprises iteratively decreasing the ground speed until the air pressure differential is less than or equal to the threshold value.

13. The method of claim 11, further comprising, after the controlling the speed control system that decreases the ground speed, then controlling, via the controller, the operational air source that iteratively decreases the operational air flow until the air pressure differential is greater than a second threshold value.

14. The method of claim 8, further comprising receiving, via the controller, a third sensor signal indicative of a third air pressure at a third location within the line of the air-assisted conveying system;

wherein the air pressure differential is determined based on the first air pressure, the second air pressure, and the third air pressure.

15. An air-assisted conveying system of an agricultural harvester, comprising:

a controller comprising a memory and a processor, wherein the controller:

receives a first sensor signal indicative of a first air pressure at a first location within a line of the air-assisted conveying system;

receives a second sensor signal indicative of a second air pressure at a second location within the line of the air-assisted conveying system;

determines an air pressure differential based on the first air pressure and the second air pressure;

in response to determining that the air pressure differential is greater than a threshold value:

controls an operational air source that iteratively increases an operational air flow through the line during a plurality of iterations, wherein the plurality of iterations comprises an initial iteration and one or more successive iterations, wherein an operational air flow of each of the one or more successive iterations is greater than an operational air flow of a preceding iteration of the plurality of iterations, and wherein the controller iteratively increases the operational air flow until the air pressure differential is less than or equal to the threshold value or a maximum number of iterations is reached; and in response to the maximum number of iterations being reached, controls a speed control system that decreases a ground speed of the agricultural harvester.

16. The air-assisted conveying system of claim 15, wherein the controls the speed control system that decreases the ground speed comprises iteratively decreasing the ground speed until the air pressure differential is less than or equal to the threshold value.

17. The air-assisted conveying system of claim 15, wherein the controller, after the controls the speed control system that decreases the ground speed, then iteratively decreases the operational air flow until the air pressure differential is greater than a second threshold value.

18. The air-assisted conveying system of claim 15, wherein the controller further receives a third sensor signal indicative of a third air pressure at a third location within the line of the air-assisted conveying system, and the controller determines the air pressure differential based on the first air pressure, the second air pressure, and the third air pressure.

19. The air-assisted conveying system of claim 15, further comprising a display communicatively coupled to the controller;

wherein the controller controls the display in presenting the air pressure differential, an output of the operational air source, the ground speed of the agricultural harvester, or a combination thereof.

20. The air-assisted conveying system of claim 15, further comprising:

a first air pressure sensor that fluidly couples to the line at the first location, wherein the first air pressure sensor outputs the first sensor signal; and a second air pressure sensor to fluidly couples to the line at the second location, wherein the second air pressure sensor outputs the second sensor signal.

* * * * *